(12) United States Patent
Ushio et al.

(10) Patent No.: US 11,385,524 B2
(45) Date of Patent: Jul. 12, 2022

(54) ELECTRONIC DEVICE

(71) Applicant: NIDEC COPAL CORPORATION, Tokyo (JP)

(72) Inventors: Ryosuke Ushio, Tokyo (JP); Kenzo Imai, Tokyo (JP); Nobuaki Watanabe, Tokyo (JP)

(73) Assignee: NIDEC COPAL CORPORATION, Tokyo (JP)

( * ) Notice: Subject to any disclaimer, the term of this patent is extended or adjusted under 35 U.S.C. 154(b) by 33 days.

(21) Appl. No.: 16/941,537

(22) Filed: Jul. 29, 2020

(65) Prior Publication Data

US 2021/0033947 A1 Feb. 4, 2021

(30) Foreign Application Priority Data

Jul. 30, 2019 (JP) .............................. JP2019-140044

(51) Int. Cl.
  *G03B 11/04* (2021.01)
  *G03B 17/02* (2021.01)
(52) U.S. Cl.
  CPC ............ *G03B 11/043* (2013.01); *G03B 17/02* (2013.01)
(58) Field of Classification Search
  USPC ........................................................ 396/448
  See application file for complete search history.

(56) References Cited

U.S. PATENT DOCUMENTS

| 8,988,532 | B2 * | 3/2015 | Soffer | H04N 5/2252 |
| | | | | 348/207.1 |
| 10,182,213 | B2 * | 1/2019 | Brunson | H04N 5/2251 |
| 10,887,763 | B2 * | 1/2021 | Yang | G06F 1/1616 |
| 2012/0148227 | A1 * | 6/2012 | Schmit | G03B 11/043 |
| | | | | 396/448 |
| 2016/0241748 | A1 * | 8/2016 | Chang | G06F 1/1626 |
| 2020/0174340 | A1 * | 6/2020 | Imai | G03B 9/26 |
| 2021/0033948 | A1 * | 2/2021 | Ushio | G03B 11/043 |

FOREIGN PATENT DOCUMENTS

| JP | S62156919 A | 7/1987 |
| JP | H9211537 A | 8/1997 |
| JP | 2003121903 A | 4/2003 |
| JP | 3170619 U | 9/2011 |

* cited by examiner

*Primary Examiner* — Rodney E Fuller
(74) *Attorney, Agent, or Firm* — Hauptman Ham, LLP

(57) ABSTRACT

A technique reduces images unintended by the user captured with an electronic device by, for example, unauthorized access or an accidental operation performed by the user. An electronic device includes a camera module including a camera drive that activates or deactivates a camera function, a blade that opens or closes a lens aperture in the camera module, a blade drive that drives an actuator to open or close the blade, a controller that controls the camera drive and the blade drive, and a switch that transmits, to the controller, an opening signal or a closing signal for forcibly driving the blade drive independently of the camera drive. The controller activates the camera function in the camera drive in response to the opening signal transmitted from the switch.

12 Claims, 10 Drawing Sheets

ELECTRONIC DEVICE

RELATED APPLICATIONS

The present application claims priority to Japanese Application Number 2019-140044, filed Jul. 30, 2019, the disclosure of which is hereby incorporated by reference herein in its entirety.

BACKGROUND

Technical Field

The present invention relates to an electronic device.

Description of the Background

Many recent electronic devices are capable of processing, storing, and transmitting obtained images, and commonly incorporate a camera module for capturing images. Many recent electronic devices are also used while connected to a network, as expressed in the Internet of Things (IoT). Such electronic devices have measures against unauthorized external access through the network.

Such an electronic device with a camera module typically has a lens aperture in the camera module constantly uncovered. In the IoT, the camera function may be activated by a malicious remote operation, possibly capturing images unintended by the user. This can cause leakage of private images or degraded security due to unauthorized image capturing.

Typical examples of electronic devices with a camera module include smartphones or other mobile information terminals. The user carrying such a mobile information terminal can accidentally activate the camera function by an unintended operation. In such a case, images unintended by the user may be captured and stored in the electronic device, possibly causing external leakage of the stored images or the user being suspected of secretly taking pictures.

In response to the issue, the lens aperture may be covered with a shield when the camera is unused and may be uncovered when the camera is used. For example, a slidable shield in a housing of an electronic device may be manually slid to uncover the lens aperture when the camera is used and may be manually slid to cover the lens aperture when the camera is unused (refer to Patent Literature 1 below).

CITATION LIST

Patent Literature

Patent Literature 1: Japanese Registered Utility Model No. 3170619

BRIEF SUMMARY

The known technique described above uses a shield covering the lens aperture when the camera function is unused to reduce images unintended by the user captured with the electronic device. However, the manually operated shield is to be manually operated before an operation to activate the camera function, thus causing an additional operation. The device has lower operability in operating the camera.

With the known technique of manually operating the shield, the user can often forget to operate the shield. When the user forgets to cover the lens aperture when deactivating the camera function, the camera function may be activated by unauthorized access or an accidental operation with the lens aperture being open. When the user forgets to uncover the lens aperture when activating the camera function, an intended image supposedly captured may not be captured with the lens aperture being covered.

A shield to be open or closed in response to activation or deactivation of the camera function can open in response to activation of the camera function unintended by the user, causing images unintended by the user to be captured with the electronic device.

In response to the above issue, one or more aspects of the present invention are directed to techniques for reducing images unintended by the user captured with an electronic device by, for example, unauthorized access or an accidental operation performed by the user, increasing operability in using the camera by eliminating an additional operation, and reducing image capturing unintended by the user when the camera function is activated and deactivated in response to opening and closing of the lens aperture.

The device according to one or more aspects of the present invention has the structure described below.

An electronic device includes a camera module including a camera drive that activates or deactivates a camera function, a blade that opens or closes a lens aperture in the camera module, a blade drive that drives an actuator to open or close the blade, a controller that controls the camera drive and the blade drive, and a switch that transmits, to the controller, an opening signal or a closing signal for forcibly driving the blade drive independently of the camera drive. The controller activates the camera function in the camera drive in response to the opening signal transmitted from the switch.

DETAILED DESCRIPTION

Figure 1:
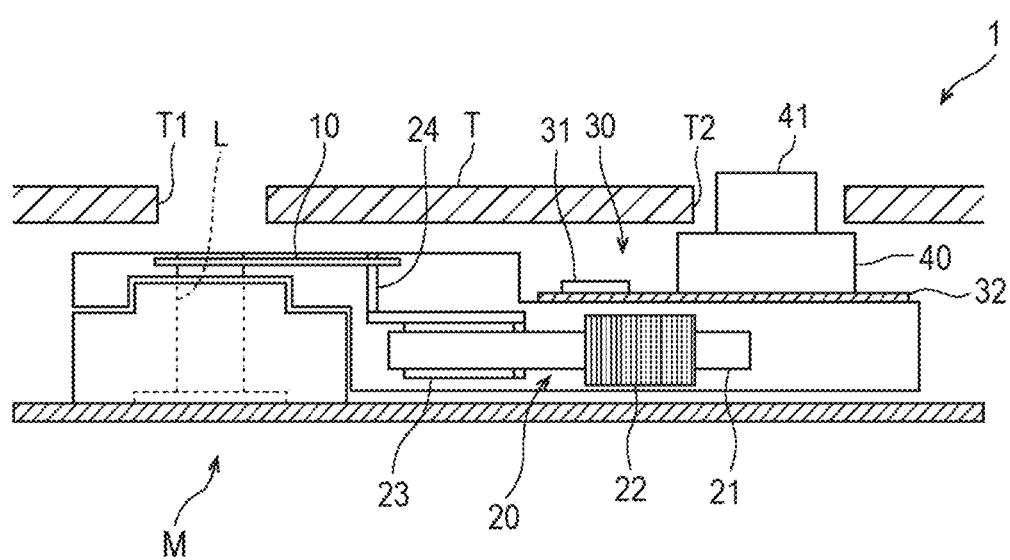
FIG. 1 is a schematic diagram of an electronic device showing main components.

Embodiments of the present invention will now be described with reference to the drawings. Hereafter, the components with similar functions in different figures are indicated by like reference numerals, and will not be described repeatedly.

As shown in FIG. 1, an electronic device 1 includes a camera module M, a blade 10 for opening or closing a lens aperture L in the camera module M, an actuator 20 for opening or closing the blade 10, a blade drive 30 for driving the actuator 20, and a switch 40 for transmitting a signal (an opening signal or a closing signal) causing the blade drive 30 to perform an opening or closing operation.

In the illustrated example, the camera module M is accommodated in a housing T of the electronic device 1. The camera module M is located to allow the blade 10 to open or close the lens aperture L, which is coaxial with an opening T1 in the housing T, in the camera module M. The blade 10 is a thin plate having a thickness along the center axis of the lens aperture L. The blade 10 is slidable in a direction crossing the center axis of the lens aperture L and is movable between a position to cover the lens aperture L (closed state) and a position to uncover the lens aperture L (open state).

The actuator 20 moves the blade 10 to either of the two positions at which the blade 10 is open or closed. In the illustrated example, the actuator 20 includes a yoke 21, a coil 22 wound around the yoke 21, a rotor magnet 23 rotatable by magnetic polarities alternating at the ends of the yoke 21 as the coil 22 is energized, and a lever 24 connecting the rotor magnet 23 to the blade 10. The actuator 20 may have another specific structure.

The blade drive 30 drives the actuator 20. In the illustrated example, the blade drive 30 includes a driver 31 that energizes the coil 22 and a circuit board 32 on which the driver 31 is mounted. The switch 40 selectively transmits either an opening signal or a closing signal. In the illustrated example, the switch 40 includes an operation member 41 protruding outside through an opening T2 in the housing T. The operation member 41 is pressed to generate either an opening signal or a closing signal.

In the illustrated example, the switch 40 is mounted on the circuit board 32 in the blade drive 30 near the camera module M. The blade drive 30 and the switch 40 are supported integrally with the actuator 20. In some embodiments, the switch 40 may be mounted on a circuit board for the camera module M or may be located away from the camera module M.

Figure 2:
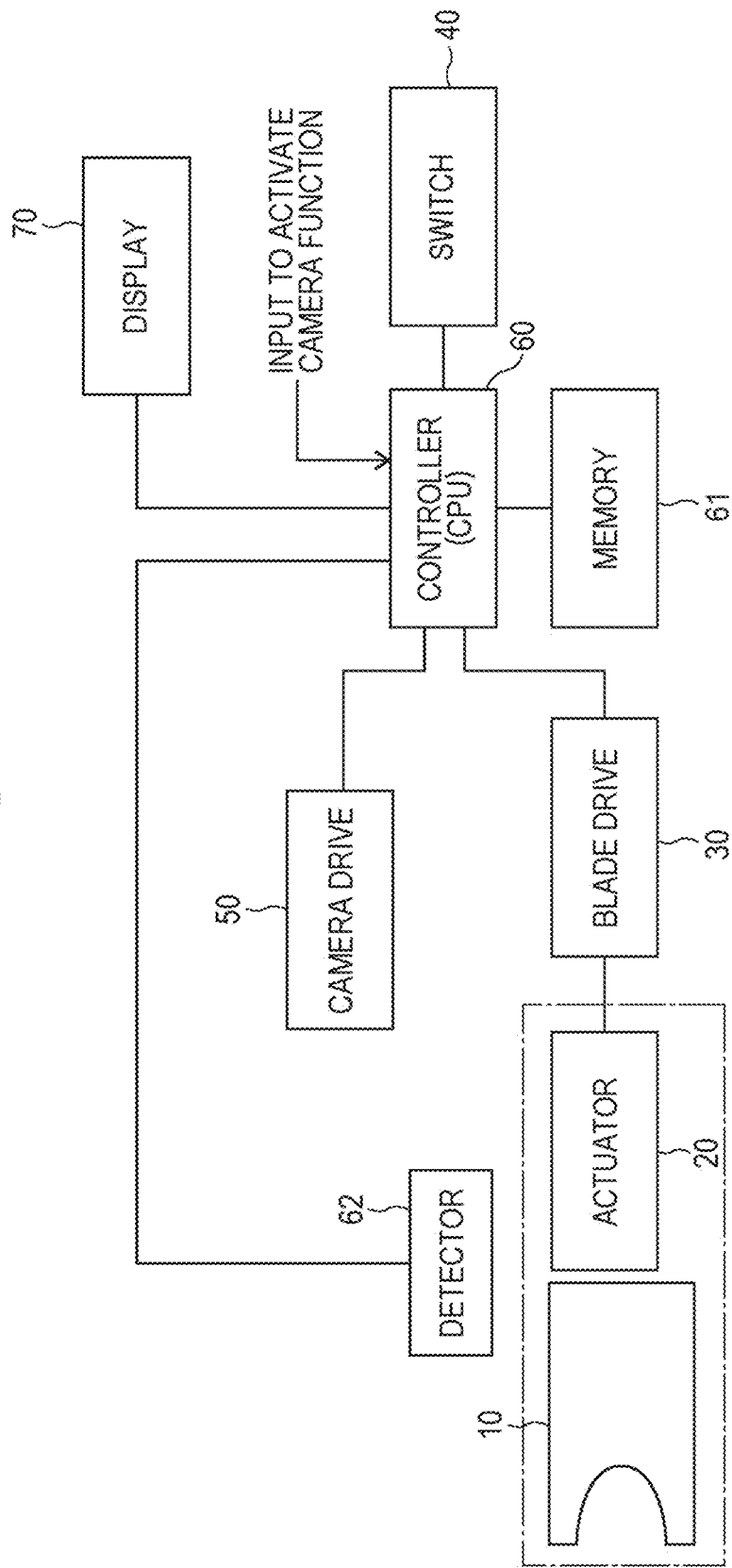
FIG. 2 is a schematic diagram describing the relationship between a blade drive, a camera drive, and a controller.

FIG. 2 is a schematic diagram of a controller (central processing unit or CPU) 60 that controls the blade drive 30 and a camera drive 50. The controller 60 controls the blade drive 30 in response to an opening signal or a closing signal from the switch 40. The CPU serving as the controller 60 may be mounted on the circuit board 32 in the blade drive 30 or may be mounted on a circuit board in the camera drive 50. The CPU serving as the controller 60 may be mounted on each of the circuit board 32 in the blade drive 30 and the circuit board in the camera drive 50. The two CPUs communicate with each other. The controller 60 may be replaced by any CPU controlling another functional unit in the electronic device 1.

The controller 60 receives a detection signal from a detector 62 (e.g., a photointerrupter, or PI, sensor or a Hall sensor) that detects an open or closed state of the blade 10 or an open or close driving state of the actuator 20, or receives a signal from a memory 61 that stores the transmission history of the opening signal or the closing signal from the switch 40. Either the detector 62 or the memory 61, or both may be used. In the illustrated example, the controller 60 outputs a confirmation signal (described later) to a display 70. The controller 60 controls the blade drive 30 and the camera drive 50 in response to an input from the detector 62 or the memory 61.

The switch 40 transmits the opening signal or the closing signal to the controller 60 to cause the controller 60 to forcibly drive the blade drive 30 independently of the camera drive 50. In response to a closing operation performed on the switch 40, the actuator 20 is thus driven to close the blade 10 independently of the operating state of the camera drive 50. In response to an opening operation performed on the switch 40, the actuator 20 is driven to open the blade 10 independently of the operating state of the camera drive 50.

When the switch 40 receives an opening operation, the user clearly has an intention of using the camera. In this case, the controller 60 causes the blade drive 30 to perform an opening operation in response to the opening signal transmitted from the switch 40, and activates the camera function of the camera drive 50 in response to the opening operation. Activating the camera function herein includes, for example, activating a camera application to have the camera application ready for image capturing.

When the switch 40 receives a closing operation, the user clearly has no intention of using the camera. In this case, the controller 60 causes the blade drive 30 to perform a closing operation in response to a closing signal transmitted from the switch 40, and deactivates the camera function of the camera drive 50 in response to the closing operation. Deactivating the camera function herein includes, for example, deactivating the camera application and returning the camera application to a selected state.

In the manner described above, when the camera use is intended by the user, the lens aperture L in the camera module M is reliably opened by the opening operation performed on the switch 40. When the camera use is unintended by the user, the lens aperture L in the camera module M is reliably closed by the closing operation performed on the switch 40. The opening or closing operation of the blade 10 is followed by activation or deactivation of the camera function, eliminating an additional operation.

For the user who may forget to operate the switch 40, the electronic device 1 also has the function of automatically opening or closing the blade 10 in accordance with the activation status of the camera drive 50. The automatic open-close function allows the blade drive 30 to perform an opening operation simply in response to activation of the camera drive 50, and may allow the blade drive 30 to perform an opening operation when the camera drive 50 is activated by a remote operation through unauthorized access or by an accidental operation. To avoid this, the controller 60 has a control algorithm for causing the blade drive 30 to conditionally perform the opening or closing operation automatically.

Figure 3:
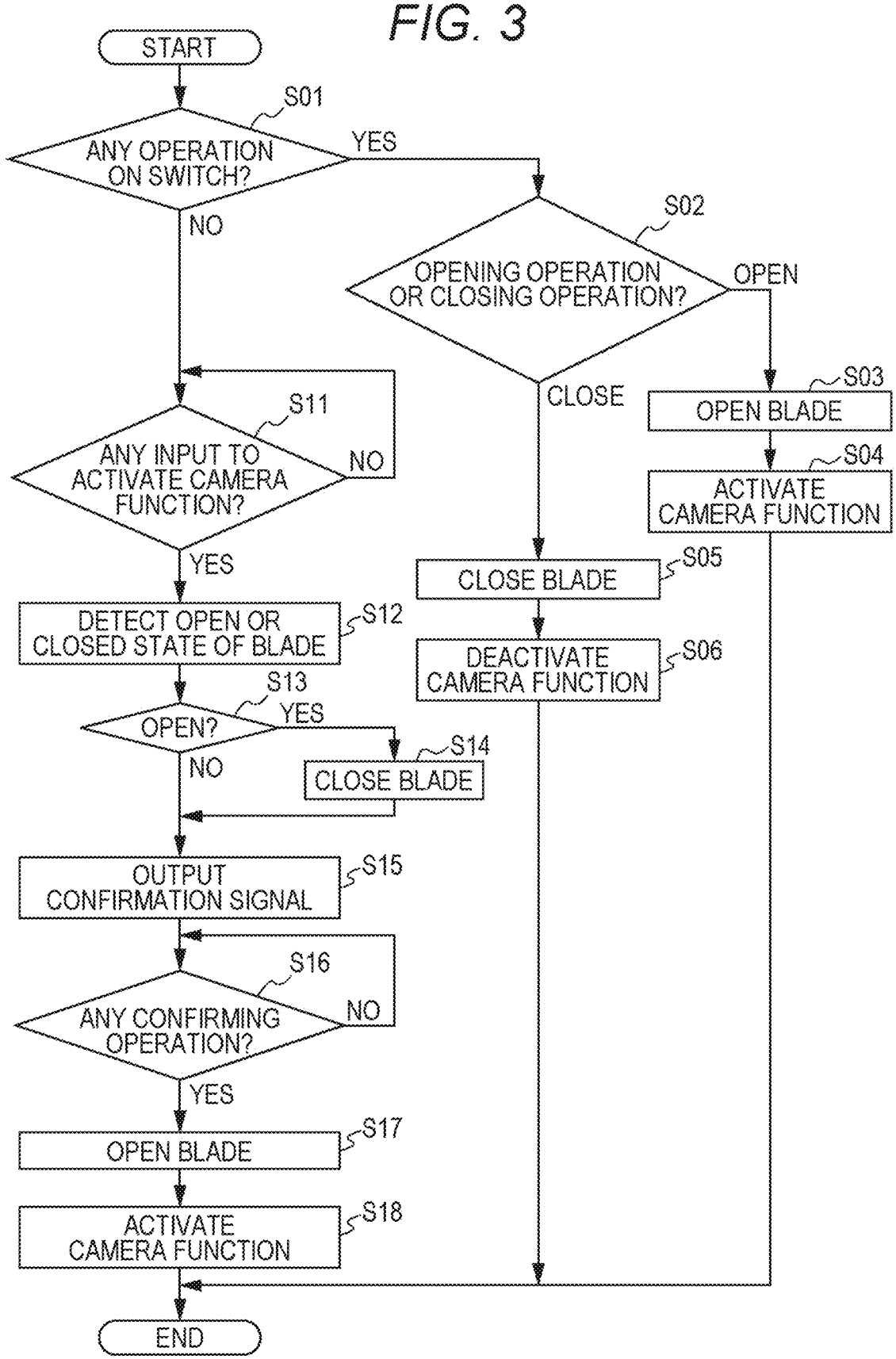
FIG. 3 is a flowchart showing an example control operation performed by the controller.

FIG. 3 is a flowchart showing an example of the control algorithm. In this example, the controller 60 first determines whether the switch 40 is operated (step S01). The controller 60 determines that the switch 40 is operated when receiving an opening signal or a closing signal from the switch 40.

When the switch 40 is operated (YES in step S01), the controller 60 determines whether the operation on the switch 40 is an opening operation (transmission of an opening signal) or a closing operation (transmission of a closing signal) (step S02). When the operation is an opening operation (Open in step S02), the controller 60 controls the blade drive 30 to open the blade 10 (step S03) and controls the camera drive 50 to activate the camera function (step S04). When the operation on the switch 40 is a closing operation (Close in step S02), the controller 60 controls the blade drive 30 to close the blade 10 (step S05) and controls the camera drive 50 to deactivate the camera function (step S06).

When no operation is performed on the switch 40 in step S01 (NO in step S01), the controller 60 waits for any input to activate the camera function (NO in steps S1). When receiving an input to activate the camera function (YES in steps S11), the controller 60 detects an open or closed state of the blade 10 (step S12) to prepare for any possibility that the input is unintended by the user, or more specifically, the input is performed remotely through unauthorized access or accidentally.

The open or closed state of the blade 10 is detected (step S13) based on, for example, a detection signal obtained by the detector 62 described above detecting the position of the blade 10 or the rotation state of the rotor magnet 23 in the actuator 20. The state of the blade 10 may also be detected based on the transmission history about the switch 40 stored in the memory 61, indicating that the latest signal is an opening signal or a closing signal.

When the blade 10 is determined to be open (YES in step S13). The blade drive 30 is controlled to close the blade 10 (step S14). The lens aperture L is thus closed, reducing images unintended by the user captured with the electronic device 1 in response to an input to activate the camera function performed by unauthorized access or an accidental operation unintended by the user.

After the lens aperture L is closed, the controller 60 outputs, to, for example, the display 70, a confirmation signal to confirm that the blade 10 is to be open (step S15) and displays, for example, a confirmation massage on the display 70. When no confirming operation is performed by the user (NO in step S16). The controller 60 waits for any confirming operation. When a confirming operation such as an opening operation on the switch 40 is performed (YES in step S16), the controller 60 controls the blade drive 30 to open the blade 10 (step S17) and controls the camera drive 50 to activate the camera function (step S18).

The control allows any operation performed on the switch 40 intentionally by the user to open or close the blade 10, followed by activation or deactivation of the camera function. This eliminates an additional operation. When any input to activate the camera function is received before the switch 40 is operated, the lens aperture L is first closed and a confirmation signal is output to determine that the input is intended by the user. After the user intention is confirmed, the blade 10 is open, followed by activation of the camera function. This reduces image capturing unintended by the user and improves operability in using the camera.

Figure 4:
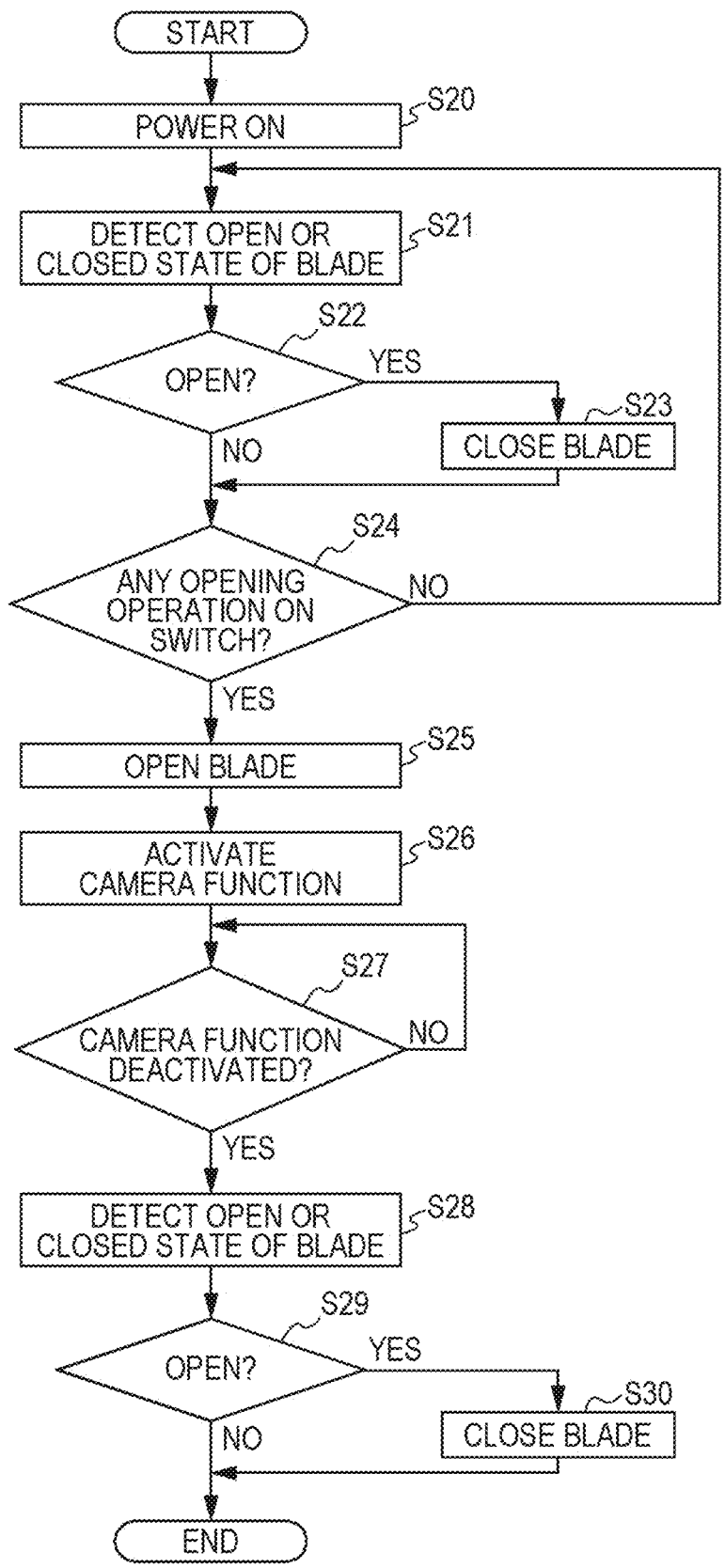
FIG. 4 is a flowchart showing another example control operation performed by the controller.

FIG. 4 is a flowchart showing another example of a control algorithm. In this control, the switch 40 receives an opening operation alone. The blade 10 is closed fully automatically. When the electronic device 1 is powered on (step S20), the controller 60 first detects an open or closed state of the blade 10 (step S21). This detection is performed in the same manner as in step S12 described above.

When determining that the blade 10 is open (YES in step S22), the controller 60 controls the blade drive 30 to close the blade 10 (step S23). The lens aperture L being open before the device is powered on can be closed each time.

The controller 60 then waits for any opening operation on the switch 40 (NO in step S24) with the lens aperture L being closed. When an opening operation is performed on the switch 40 (YES in step S24), the blade 10 is open, followed by activation of the camera function, in the same manner as in steps S17 and S18 described above. The controller 60 then waits for deactivation of the camera function (NO in step S27).

When the camera function is deactivated (YES in step S27), an open or closed state of the blade 10 is detected in the same manner as in step S21. When the open state of the blade 10 is detected (YES in step S29), the blade 10 is closed (step S30) and the control ends. When the open state of the blade 10 is not detected (NO in step S29), the blade 10 is determined to be closed and the control ends.

In the above control, the blade 10 is not open unless the user intentionally performs an opening operation on the switch 40. When the device is powered on or the camera function is deactivated, the blade 10 is automatically closed. This prevents the lens aperture L from being left uncovered unintentionally and retains the closed state of the lens aperture L when the camera function is activated without user intention. This reduces image capturing unintended by the user and improves operability in using the camera.

Figure 5:
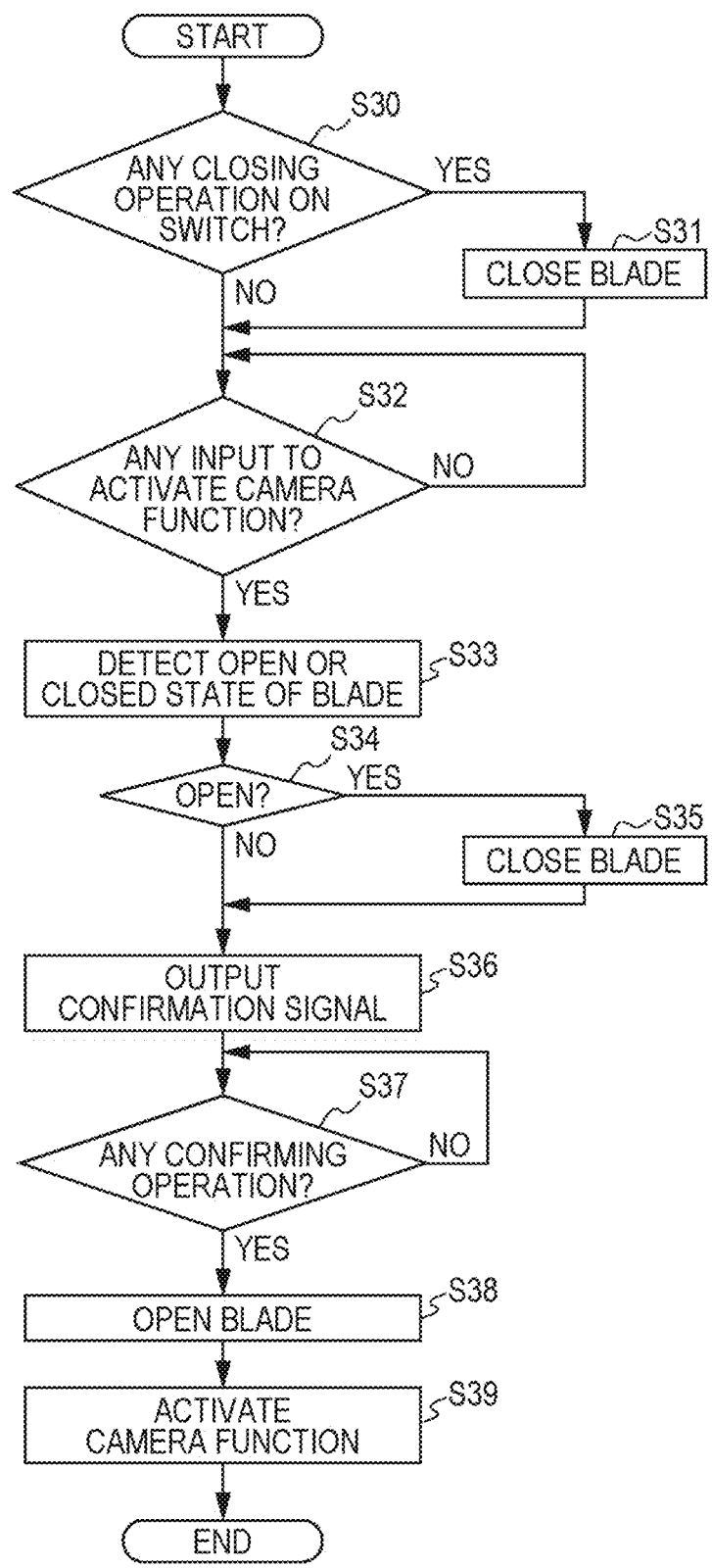
FIG. 5 is a flowchart showing another example control operation performed by the controller.

FIG. 5 is a flowchart showing still another example of a control algorithm. In this control, the switch 40 receives a closing operation alone. The blade 10 is open fully automatically. First, in response to a closing operation performed on the switch 40 (YES in step S30), the controller 60 controls the blade drive 30 to close the blade 10.

Subsequently or when no closing operation is performed on the switch 40 (NO in step S30), the controller 60 waits for any input to activate the camera function (NO in step S32). In response to an input to activate the camera function (YES in step S32), an open or closed state of the blade 10 is detected in the same manner as in step S21 (step S33). The blade 10 is closed in steps S34 and S35.

The controller 60 then outputs to, for example, the display 70, a confirmation signal to confirm that the camera function is to be activated (step S36) and displays, for example, a confirmation massage on the display 70. When no confirming operation is performed by the user (NO in step S37), the controller 60 waits for any confirming operation. When a confirming operation is performed (YES in step S37), the controller 60 controls the blade drive 30 to open the blade 10 (step S38) and controls the camera drive 50 to activate the camera function (step S39).

The above control causes a confirmation signal to be output every time before the blade 10 is open automatically, confirming that activation of the camera function is intended by the user. This prevents the camera function from being activated and capturing images in response to an input to activate the camera function as unintended by the user.

Figure 6A:
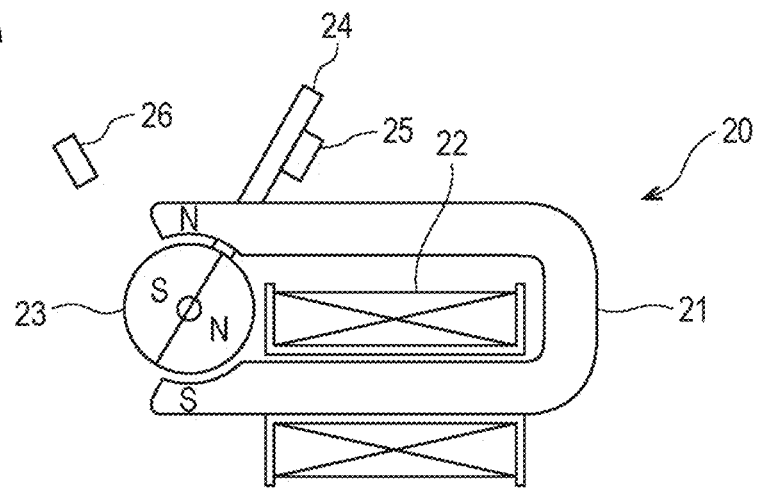
FIG. 6A is a schematic diagram of an actuator in an opening operation.
Figure 6B:
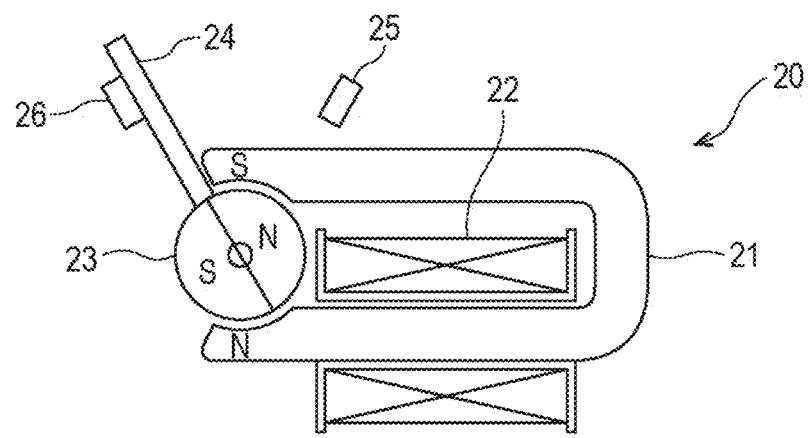
FIG. 6B is a schematic diagram of the actuator in a closing operation.

FIGS. 6A to 6C and FIGS. 7A to 7C are diagrams showing example operations of the actuator. The actuator 20 may be a known actuator. In the illustrated example, a unidirectional current flows through the coil 22, causing the two ends of the yoke 21 adjacent to the rotor magnet 23 to be magnetically polarized oppositely to each other as shown in FIG. 6A. The magnetic force attracts and rotates the rotor magnet 23, and moves the lever 24 to the opening position of the blade 10. The current through the coil 22 is reversed, reversing the magnetic polarities at the two ends of the yoke 21 as shown in FIG. 6B. The magnetic force attracts and rotates the rotor magnet 23 reversely, and moves the lever 24 to the closing position of the blade 10.

Figure 6C:
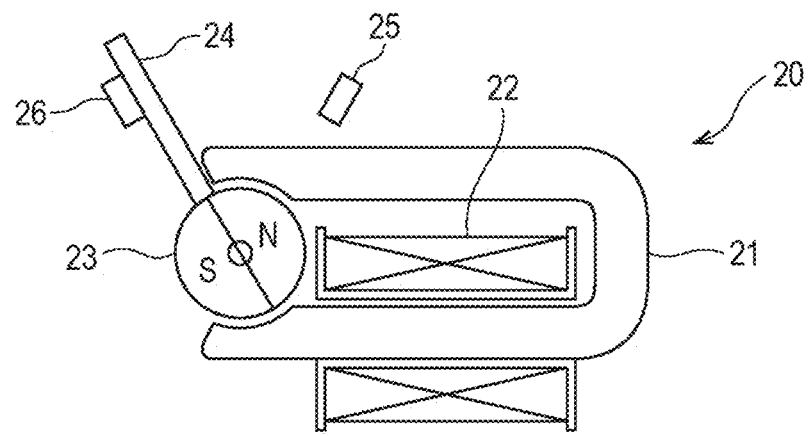
FIG. 6C is a schematic diagram of the actuator in a nonenergized state.

As shown in FIGS. 6A to 6C, magnets 25 and 26 are located at the opening and closing positions of the lever 24 to magnetically attract the lever 24, which is formed from a magnetic material. When the coil 22 is not energized, the lever 24 is attracted by the magnet 25 or 26 and can remain at the opening and closing positions as shown in FIG. 6C. The actuator 20 can thus retain the open and/or closed state of the blade 10 without being energized. This prevents the blade 10 from being stopped between the opening position and the closing position in a nonenergized state.

Figure 7A:
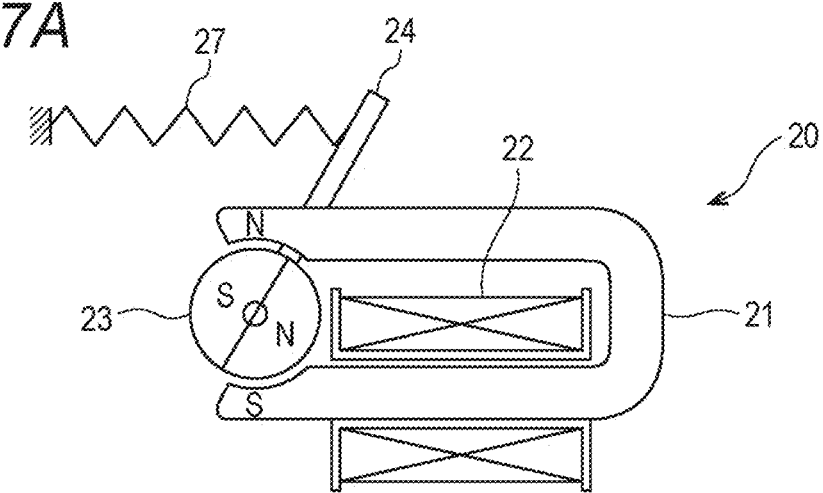
FIG. 7A is a schematic diagram of an actuator in an opening operation.
Figure 7B:
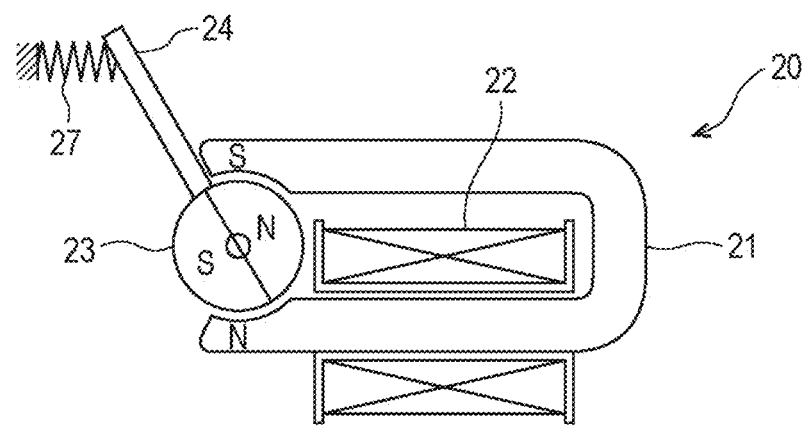
FIG. 7B is a schematic diagram of the actuator in a closing operation.
Figure 7C:
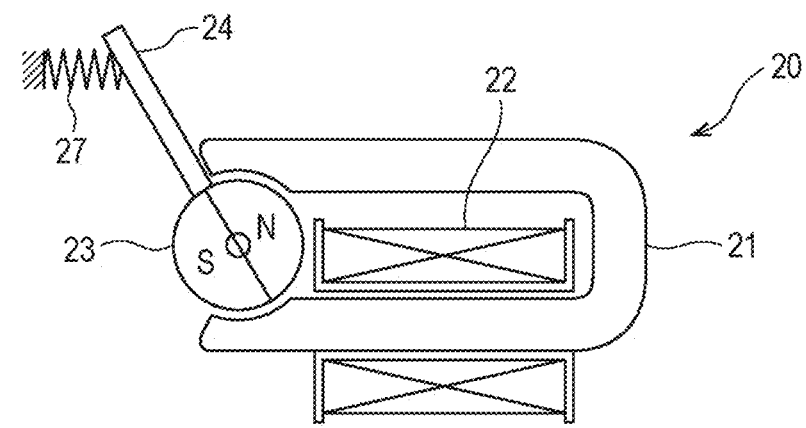
FIG. 7C is a schematic diagram of the actuator in a nonenergized state.

In the example shown in FIGS. 7A to 7C, the lever 24 is attached to an end of an urging member 27, such as a spring. When the coil 22 is not energized, the lever 24 is forcibly moved to the closing position under a tensile force from the urging member 27 as shown in FIG. 7C. The actuator 20 can thus retain the closed state of the blade 10 without being energized. The lever 24 is forcibly moved to the closing position in this example. The lever 24 may be forcibly moved to the opening position with the urging member 27 located oppositely. In the example in which the blade 10 remains closed in the nonenergized state, the lens aperture L remains closed in the nonenergized state. Thus, the lens aperture L can be closed by turning off the power when the blade 10 is not closed under the control of the controller 60 or by the operation on the switch 40.

Figure 8A:
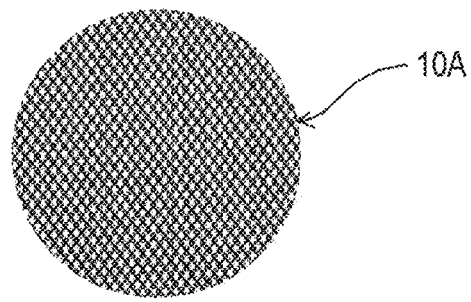
FIG. 8A is a schematic diagram of an example reticulated light shading included in a blade.
Figure 8B:
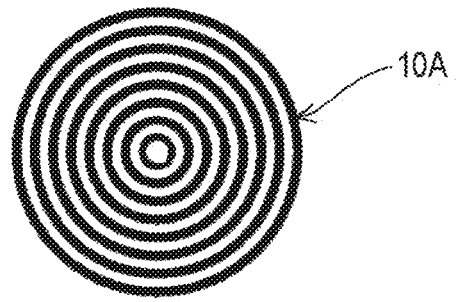
FIG. 8B is a schematic diagram of an example light shading with concentric circular gaps.
Figure 8C:
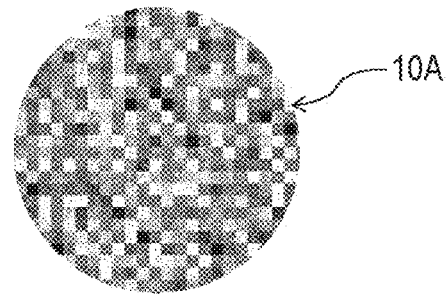
FIG. 8C is a schematic diagram of an example mosaic filter.

The blade 10 herein includes a shield 10A for covering the lens aperture L as shown in FIGS. 8A to 8C. The shield 10A may be a light shading that fully shades light incident on the lens aperture L, or may be a light shading that partially shades light incident on the lens aperture L to obstruct image capturing as shown in FIGS. 8A and 8B. An example light shading shown in FIG. 8A is reticulated. An example light shading shown in FIG. 8B includes concentric circular gaps. The light shading with such a pattern can partially shade light incident on the lens aperture L to obstruct image capturing. The shield 10A in the blade 10 may be a filter as shown in FIG. 8C. The filter filters light incident on the lens aperture L to obstruct image capturing. An example light shading shown in FIG. 8C is a mosaic filter for filtering light incident on the lens aperture L to obstruct image capturing.

Figure 9A:
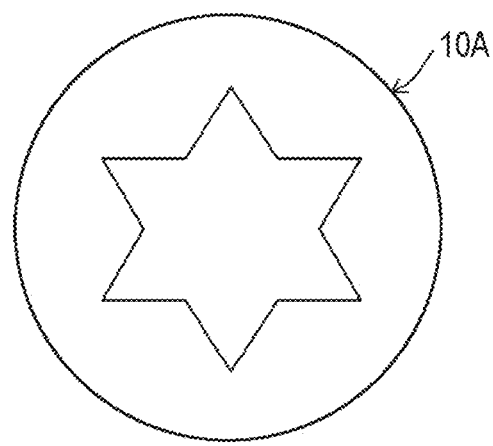
FIG. 9A is a schematic diagram of an example blade having its outer surface designed with a pattern.
Figure 9B:
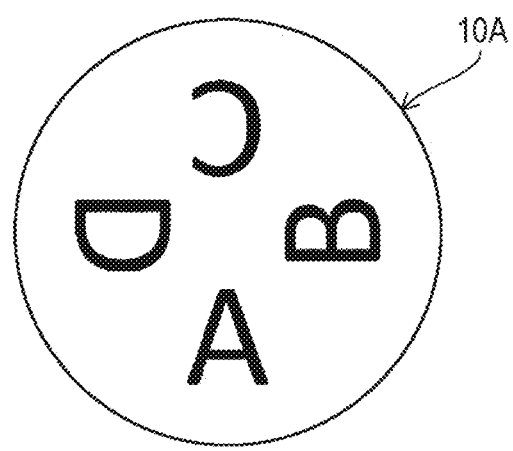
FIG. 9B is a schematic diagram of an example blade having its outer surface designed with characters.

The blade 10 in the closed state may be externally viewable for the user to see the state. The blade 10 may have an outer surface colored with a highly visible color, such as red. The blade 10 may also include the shield 10A having the outer surface with a designed pattern as shown in FIG. 9A. The blade 10 may also have designed characters to improve the appearance as shown in FIG. 9B.

Figure 10:
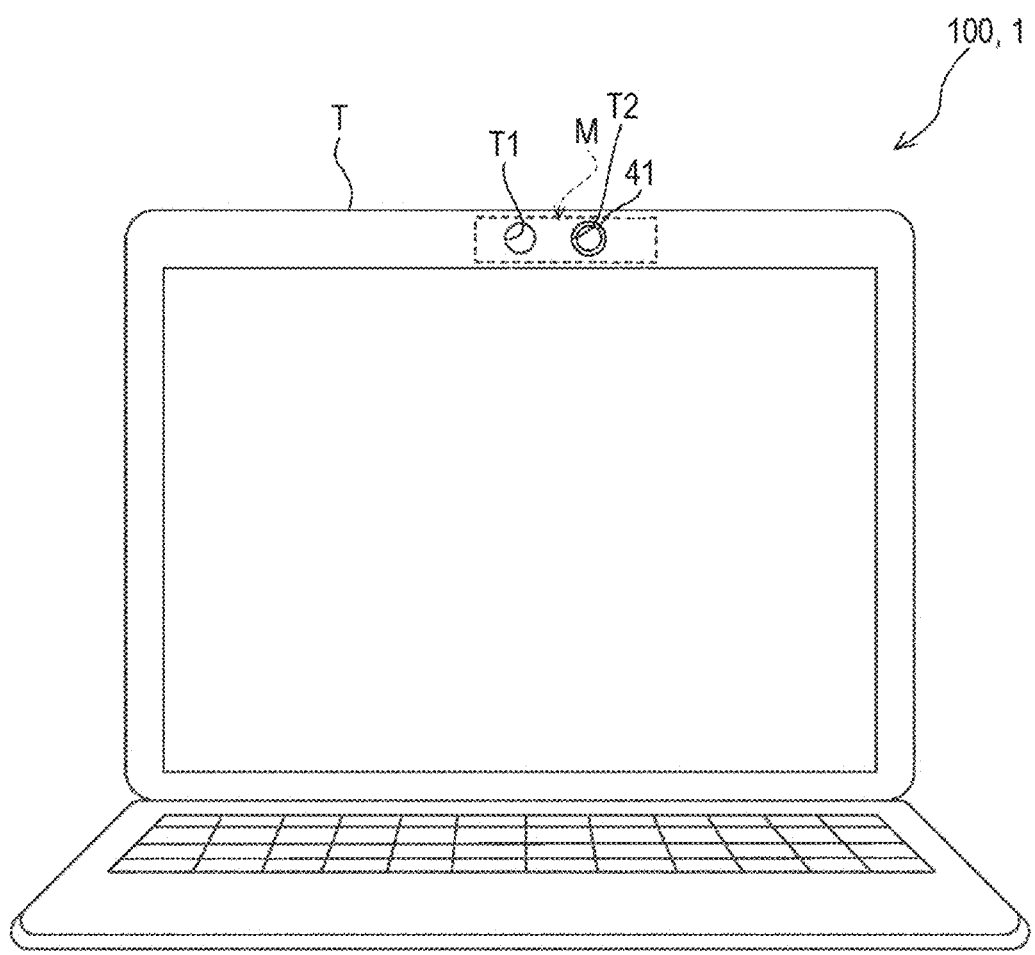
FIG. 10 is a schematic diagram of an example electronic device (laptop personal computer).

FIG. 10 is a schematic diagram of a laptop personal computer (PC) 100 with a camera function as an example of the electronic device 1. The electronic device 1 may be used in many IoT devices having a camera function, in addition to a PC, such as smartphones or other mobile information terminals, smart speakers with a camera function, and home security cameras. The camera function herein includes a sensor function in an infrared camera.

As shown FIG. 1, a driving mechanism for the blade 10 including the thin actuator 20 can fit in a space with a size for the camera module M without using a large space on its front. The blade drive 30 and the switch 40 supported integrally with the actuator 20 as a unit can be easily installed inside the housing T of the electronic device 1.

The electronic device 1 can prevent images unintended by the user from being captured with the electronic device 1, thus avoiding leakage of private images and the user being suspected of secretly taking pictures. The electronic device 1 with the camera function can be used without worrying in the IoT environment.

The openings T1 and T2 may have dustproofing members placed around them to prevent dust from entering the housing T. For example, a colorless, transparent resin member may be fitted around the opening T1. A spongy resin member may be placed between the edge of the opening T2 and the switch 40 as a dustproofing member.

Although the embodiments of the present invention have been described in detail with reference to the drawings, the specific structures are not limited to the above embodiments. The present invention may be modified in design without departing from the spirit and scope of the present invention. Additionally, the techniques described in the above embodiments may be combined, unless any contradiction arises in their purposes and structures.

What is claimed is:

1. An electronic device, comprising:
   a camera module including a camera drive configured to activate or deactivate a camera function;
   a blade configured to open or close a lens aperture in the camera module;
   a blade drive configured to drive an actuator to open or close the blade;
   a controller configured to control the camera drive and the blade drive; and
   a switch configured to transmit, to the controller, an opening signal or a closing signal for forcibly driving the blade drive independently of the camera drive,
   wherein the controller activates the camera function in the camera drive in response to the opening signal transmitted from the switch, and
   the controller causes the blade drive to perform a closing operation in response to detecting an open state of the blade in response to an input to activate the camera function.

2. The electronic device according to claim 1, wherein the controller outputs a confirmation signal to confirm that the blade is to be open in response to detecting a closed state of the blade in response to an input to activate the camera function, and causes the blade drive to perform an opening operation in response to a confirming operation performed for the confirmation signal.

3. The electronic device according to claim 1, wherein the controller causes the blade drive to perform the closing operation in response to detecting an open state of the blade in response to deactivation of the camera function.

4. The electronic device according to claim 1, wherein the controller causes the blade drive to perform the closing operation in response to detecting an open state of the blade when the electronic device is powered on.

5. The electronic device according to claim 1, wherein the switch transmits the opening signal to the controller.

6. The electronic device according to claim 1, wherein the controller deactivates the camera function in the camera drive in response to the closing signal transmitted from the switch.

7. The electronic device according to claim 1, wherein the actuator retains an open and/or closed state of the blade without being energized.

8. The electronic device according to claim 1, wherein the blade includes a light shading configured to fully or partially shade light incident on the lens aperture to obstruct image capturing.

9. The electronic device according to claim 1, wherein the blade includes a filter configured to filter light incident on the lens aperture to obstruct image capturing.

10. The electronic device according to claim 1, wherein the blade has an outer surface colored with a visible color or including a design.

11. An electronic device, comprising:
    a camera module including a camera drive configured to activate or deactivate a camera function;
    a blade configured to open or close a lens aperture in the camera module;

a blade drive configured to drive an actuator to open or close the blade;
a controller configured to control the camera drive and the blade drive; and
a switch configured to transmit, to the controller, a closing signal for forcibly driving the blade drive independently of the camera drive,
wherein the controller deactivates the camera function in the camera drive in response to the closing signal transmitted from the switch.

12. The electronic device according to claim 11, wherein the controller outputs, in response to an input to activate the camera function, a confirmation signal to confirm that the camera function is to be activated, and activates the camera function in the camera drive in response to a confirming operation performed for the confirmation signal.

* * * * *